United States Patent [19]

Gray

[11] Patent Number: 5,440,629

[45] Date of Patent: Aug. 8, 1995

[54] CHANGEABLE CONTOUR CONSTRUCTION OF WIRELESS TELEPHONE

[76] Inventor: Robert R. Gray, 5225 Memorial Dr., Houston, Tex. 77007

[21] Appl. No.: 87,165

[22] Filed: Jul. 2, 1993

[51] Int. Cl.[6] .............................................. H04M 1/00
[52] U.S. Cl. ..................................... 379/433; 379/434
[58] Field of Search ....................... 379/428, 433, 434; D14/138, 147, 148

[56] References Cited

U.S. PATENT DOCUMENTS

| | | | |
|---|---|---|---|
| 4,782,527 | 11/1988 | Williamson et al. | 379/430 |
| 5,109,539 | 4/1992 | Inubushi et al. | 379/433 |
| 5,235,561 | 8/1993 | Seager | 379/433 |
| 5,260,998 | 11/1993 | Takagi | 379/433 |

*Primary Examiner*—James L. Dwyer
*Assistant Examiner*—Jack Chiang
*Attorney, Agent, or Firm*—Bush, Moseley, Riddle & Jackson

[57] ABSTRACT

A portable telephone handset construction is provided having a chassis to which is slidably assembled an end closure which is collapsible to a position for protecting a selected portion of said chassis from contact and impact by other objects and to minimize its contamination by dust and other debris. When fully extended the end closure may represent an earpiece or mouthpiece of the handset construction which is capable of angular orientation relative to the chassis so as to assume the normal configuration of the earpiece or mouthpiece of a conventional telephone handset. The end closures are guided during sliding movement relative to the chassis by means of cooperating guide tracks and guide elements. The end closures containing the earpiece and mouthpiece are articulated relative to the chassis by spring members and interrelating mechanical structure.

15 Claims, 3 Drawing Sheets

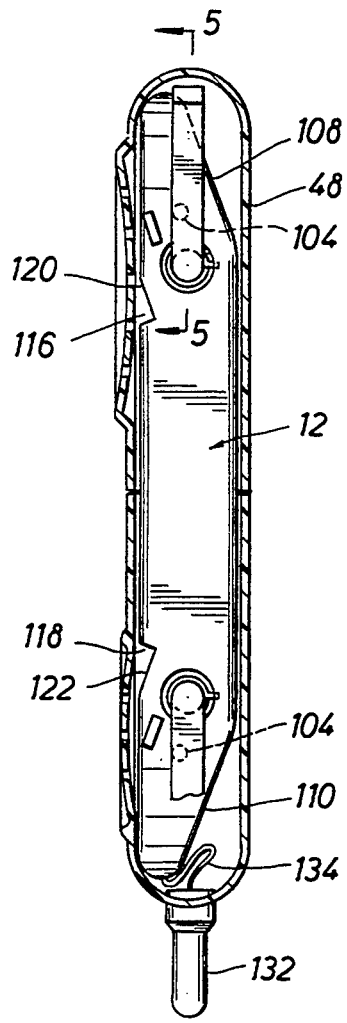
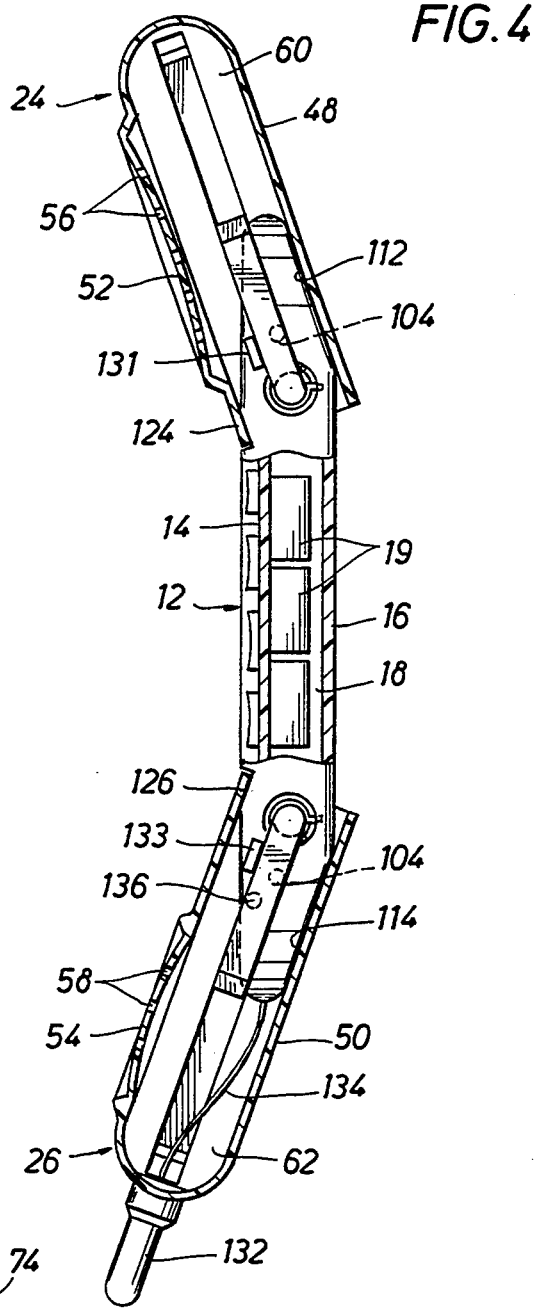

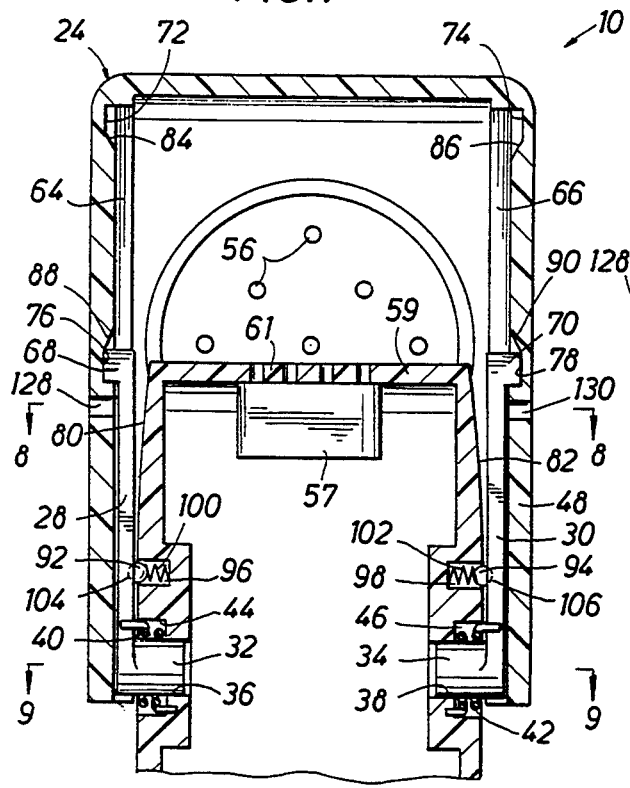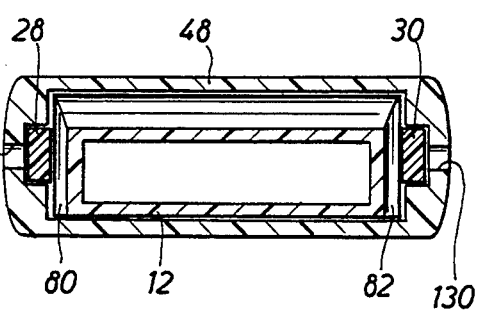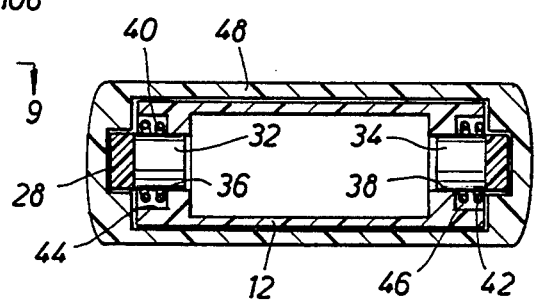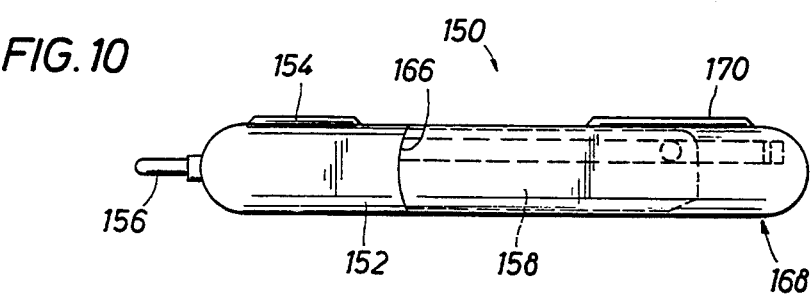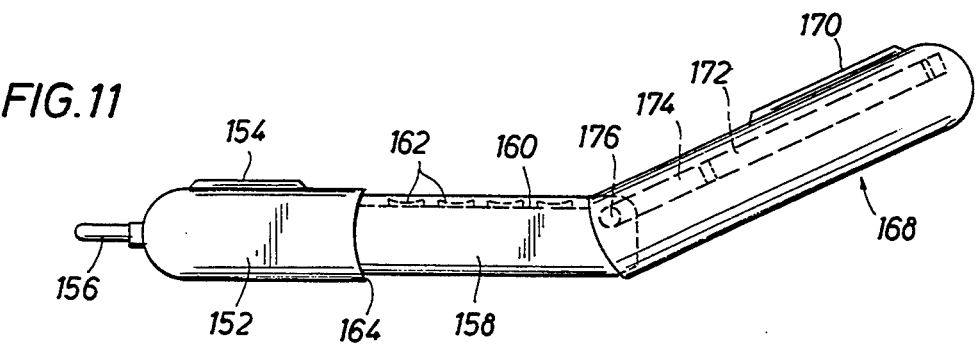

CHANGEABLE CONTOUR CONSTRUCTION OF WIRELESS TELEPHONE

FIELD OF THE INVENTION

This invention relates generally to portable telephone handsets that are usable in connection with wireless telephone communications. More particularly, the present invention concerns a telephone handset construction having a slidably movable end closure that cooperates to enclose and protect the controls (normally a keypad) and electronics section of the handset from contact and impact by other objects and from contamination by dust and other foreign matter. This invention also relates to wireless telephones which are efficiently designed for transportation in pockets of the users wearing apparel, purses etc. and which are desirably contoured after collapsing to facilitate sliding into and from pockets of clothing, and for efficient and comfortable use by means of recontouring after extending end enclosure(s), and then by articulation of the end enclosures to form a shape much more suitable for operation as a telephone handset.

BACKGROUND OF THE INVENTION

The term "telephone handset" as used herein is intended to encompass complete telephone communications systems wherein all system components may be incorporated within the portable handset structure. In the cellular and cordless telephone industries relatively small telephone handsets have been developed so as to enable them to be more easily transported on the person or in the transportation conveyance of the user. Examples of compact, folding telephone handsets are represented by U.S. Pat. Nos. D-300,742 of Soren et al (Motorola); 4,897,873 of Beutler et al (Motorola); 5,027,394 of Ono et al (Matsushita-Panasonic) and 5,111,503 of Takagi (Fujitsu Ltd). In each case in order to render the telephone handsets to small and compact configuration for carrying in personal clothing pockets, handbags etc., the telephone handsets are of jointed, folding construction. In use, a portion of the telephone handset is folded out typically for positioning the (apparent) microphone of the handset at a suitable distance from the earpiece. Thus folding telephone handsets are typically relatively short so that they can be more easily stored and transported, although folding handsets are typically quite bulky and are not easily carried in the pockets of clothing.

Significant advances are presently being made in battery technology for use in a wide variety of portable electronic devices such as wireless telephones, portable computers and so on. At the beginning of the wireless telephone industry adequate power supply batteries were quite large and thus the telephones for which they were designed were also quite bulky. Improved electronics efficiency and improved battery technology has allowed portable electronic equipment to become fairly small without any sacrifice from the standpoint of efficiency and effectiveness. In the future, power supply batteries for wireless telephone systems will be of significantly less dimension because of advances in those technologies and because the transmission power requirements of future wireless systems will be orders of magnitude less than present systems. Therefore the future promises handset construction dramatically smaller and more flexibly designed to be easily carried in the pockets of personal clothing. For this purpose, wireless telephones will of necessity be designed with smooth contours so as to readily slide into and from clothing pockets. The present invention is therefore generally directed to a telephone handset construction which is sufficiently small to be readily carried in a shirt pocket or inside suit pocket of the user's clothing and which is smoothly contoured for efficient sliding relation with the user's wearing apparel. Another important feature of wireless telephone systems for the future is an efficient design that will permit the telephone handset to "fit" the contour of the facial anatomy of the user and to have a comfortable "feel" during use. A necessary element of that "feel" is that when the handset is readied for use, that it present a comfortably designed "handbridge" between the earpiece and mouthpiece which comfortably fits the hand of the user. Heretofore, cellular portable handset construction has consisted of an inflexible chassis box with ear and mouthpieces being defined by the chassis box and positioned opposite one another, separated by control and display mechanisms. Even the foldover type phones, sometimes called "flip-phones", are largely a variation of the same "brick-phone" theme, effectively a short chassis box with a flap.

It is desirable to provide a wireless telephone handset having means for protecting the keypad and/or controls from inadvertent contact and impact with objects in its vicinity, and debris and contaminants that might be present in its immediate environment. It is desirable to provide a telephone handset construction that is readily and efficiently collapsible to a very small dimension that may be easily carried in the shirt pocket or suit pocket of a user, or in a handbag or other carrying device. It is also desirable to provide a collapsible handset construction for telephones which, when fully extended, assumes a configuration that readily enables the handset speaker to be positioned at the ear of the user while the microphone thereof can be positioned in efficient relation to the mouth of the user for optimum telephone communication. For this to occur it is desirable that the collapsible telephone handset construction have the capability of being slidingly collapsed for storage and transportation and extended for use and when extended to position the earpiece or mouthpiece or both in angulated relation with a chassis section so as to approximate the earpiece and mouthpiece orientation of more conventional wired telephone handsets.

In the future, nearly all telephones will be of the wireless variety and will be capable of transportation on the person or in the conveyance of the user. It is therefore desirable to provide a handset that is efficiently portable and constructed so as to facilitate efficient personal transportation and handling as well as being convenient to use.

SUMMARY OF THE INVENTION

It is therefore a principle feature of the present invention to provide a novel collapsible telephone handset construction having a handset chassis structure to which one or more closures is slidably assembled, which end closures, in the collapsed positions thereof, provides a protective enclosure especially for the keypad of the chassis from contact and impact by other objects in the environment and to protect the key pad from various contaminants to which it may be subjected during transportation and storage.

It is also a feature of this invention to provide a novel collapsible telephone handset construction incorporating a chassis having one or more end closures in sliding assembly therewith, wherein one of the closures may include means for conducting sound from a speaker to the user's ear and the other of the closures may be adapted for communicating sound from the mouth of the user to a microphone for telephone communication.

It is an even further feature of this invention to provide a novel collapsible wireless telephone handset construction having a chassis section and slidably related closures, which may be end closures, wherein at least one or both of the end closures have the capability of angulated positioning relative to the central body section so as to assume earpiece and mouthpiece orientation approximating that of a conventional wired telephone handset.

It is also a feature of this invention to provide a novel collapsible telephone handset construction having a chassis section defining guide tracks and one or more end closures having guides to enable guided sliding movement of the end closures relative to the chassis during collapsing and extension of the handset.

It is another feature of this invention to provide a novel telephone handset construction for wireless telephone communication systems which incorporates a handset chassis construction whose defining guide tracks are pivotal intermediate its extremities for articulation so as to be changeable from a substantially straight configuration, which is easily stored and transported, to an articulated configuration which ergonomically fits the facial anatomy of the user and is thus efficient and comfortable for telephone communication.

It is also a feature of this invention to provide a novel wireless telephone handset which, when collapsed, is of substantially straight, smoothly contoured configuration so as to be easily received in clothing pockets for personal transportation.

Briefly the various objects and features of the present invention are realized through the provision of a collapsible telephone handset construction having an inflexible chassis section which defines elongate guide tracks on each side thereof which pivots to direct movement of sliding end closures. Respective ends of the chassis are of less dimension than the central portion thereof so as to provide end recesses for accommodating angulated movement and internal components of the end closures. One or more end closures are disposed in sliding relation with the chassis and incorporate guide tracks or slots that receive the opposing guide members of the chassis to thus guide the end closures into proper enclosing assembly with the chassis. The handset assembly may be extended by moving an end closure lengthwise without articulation or the end closure may also be articulatable to achieve a configuration that enables both the earpiece and mouthpiece to be positioned in close proximity to the respective facial anatomy. The chassis may have a dust seal that is engaged by respective inner portions of the end closures in the fully collapsed condition. End closures so collapsed protect the keypad of the chassis from contact and impact by objects to which the handset may come into contact and also minimize contamination of the keypad by dust and other debris. The closures, or other structure of the handset may provide for directing sound from the speaker of the handset, mounted on the chassis, to the ear of the user and to direct sound from the mouth of the user to the microphone of the handset also mounted on the chassis, such direction of sound being transferred mechanically rather than electrically. In the alternative, the end closures may incorporate an internal speaker and an internal microphone attached electrically to the chassis, which are received by respective end recesses of the handset chassis when the handset is fully collapsed.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments which become obvious upon an understanding of this invention.

In the Drawings:

FIG. 1 is an elevational view of a collapsible telephone handset representing the preferred embodiment and which is constructed in accordance with the present invention and shown in the collapsed position thereof;

FIG. 2 is an elevational view of the telephone handset construction of FIG. 1 illustrating the components thereof in the fully extended position;

FIG. 3 is a sectional view of the collapsible telephone handset of this invention being shown in the collapsed position thereof;

FIG. 4 is a sectional view of the collapsible telephone handset of FIGS. 1 and 2 illustrating the angulated relation of the end closures in the fully extended positions thereof;

FIG. 5 is a partial sectional view of the telephone handset of this invention in the fully collapsed position thereof and being taken along line 5—5 of FIG. 3;

FIG. 6 is a partial sectional view of the collapsible telephone handset construction of FIGS. 1-3, taken generally along line 5—5 of FIG. 3 and showing one of the end closures in transition between the fully collapsed and fully extended positions thereof;

FIG. 7 is a partial sectional view similar to that of FIGS. 5 and 6, with one of the end closures being shown in its fully extended position;

FIG. 8 is a sectional view taken along line 8—8 of FIG. 7;

FIG. 9 is a sectional view taken along line 9—9 of FIG. 7;

FIG. 10 is an elevational view of an alternative embodiment of this invention, with internal parts thereof being illustrated by way of broken line; and FIG. 11 is an elevational view of the alternative embodiment of FIG. 10 with the end closure thereof being shown in extended and articulated relation with the chassis and with internal structure thereof being illustrated by way of broken line.

DETAILED DESCRIPTION OF PREFERRED EMBODIMENT

Figure 1:
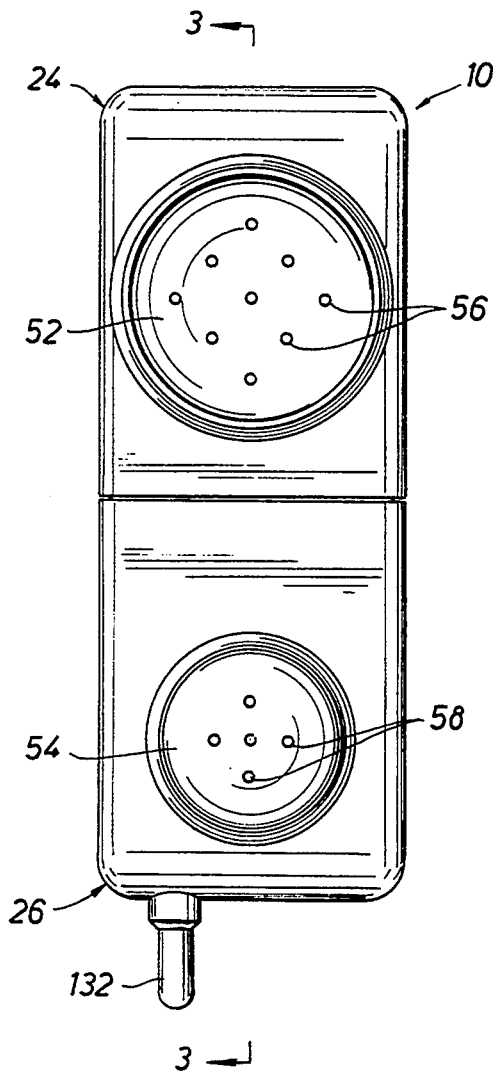
Figure 2:
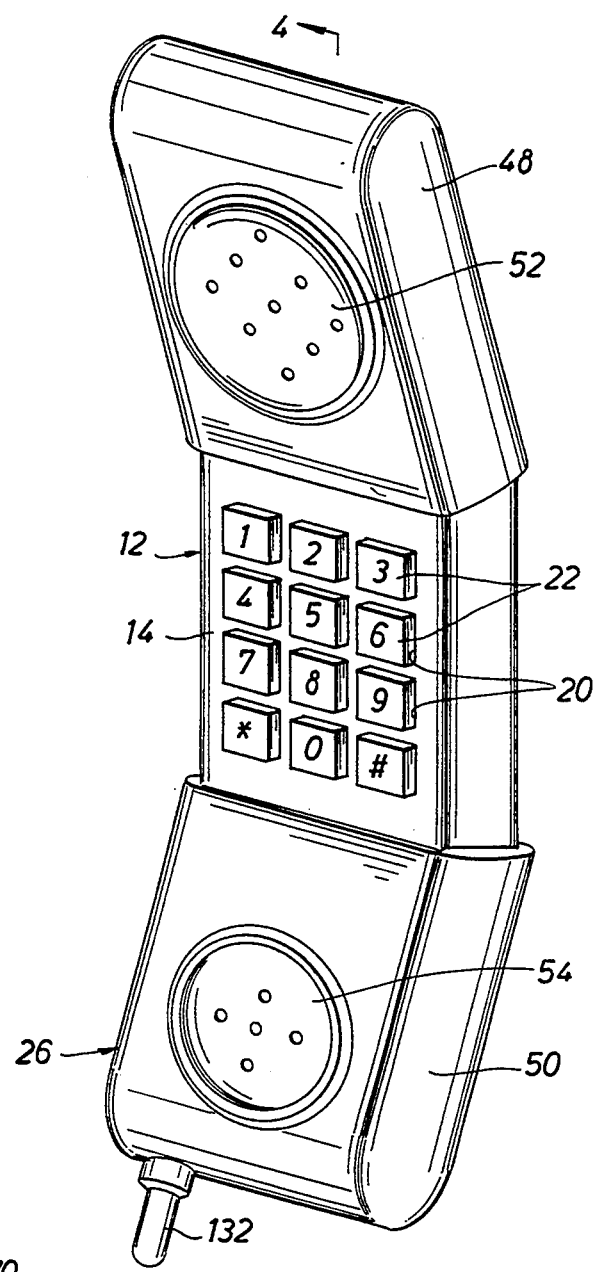

Referring now to the drawings and first to FIGS. 1, 2 and 4 a collapsible telephone handset construction embodying the principles of the present invention is illustrated generally at 10 and incorporates a chassis shown generally at 12 which incorporates a front wall structure 14 and a rear wall structure 16 which cooperatively define an internal compartment 18 for containing the electronics and power supply assemblies of the telephone handset designated at 19. The front and rear walls of the chassis are typically intended to be molded from a suitable polymer material although they may be composed of any of a variety of suitable metal or non-metal materials. The rear wall 16 is typically of planar configuration. The front wall 14 may be provided with internal structure for mounting an electronic circuit board, a power supply battery and a telephone keypad which are component parts of the electronics 19. The front wall 14 of the central body section also represents a keypad in that it defines a plurality of openings 20 through which telephone keys and buttons 22 are exposed for operative access by the user. The front wall 14 may also define a display opening for receiving an electronic display, such as a liquid crystal display or a display of any other desirable character for visual inspection by the user during operation of the handset. The electronics, battery power supply, keypad and display do not constitute a portion of the present invention. Keypad controls will normally be present in the telephone handset construction as is typically the case, except in those cases where voice recognition or other remote controlling mechanisms are employed.

Figure 5:
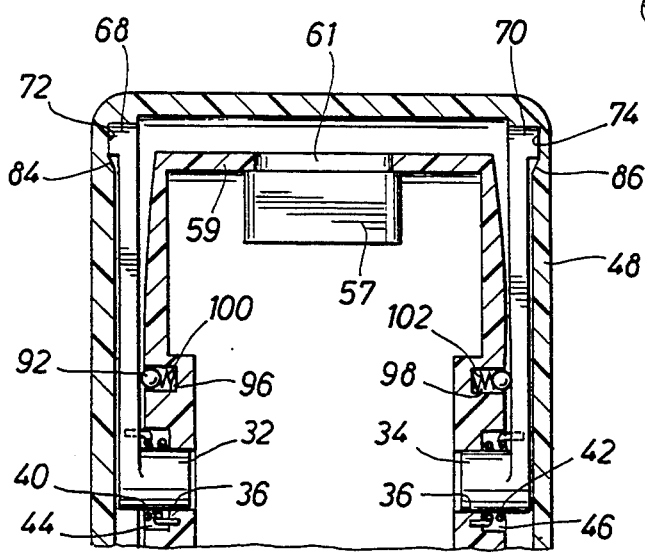

At each end of the chassis 12 there are mounted end closures shown generally at 24 and 26 which, in the preferred embodiment, are each movable linearly from the collapsed position of FIGS. 1, 3 and 5 to a fully extended position as shown in FIG. 7 and movable pivotally or articulated to an angulated position relative to the chassis as is evident particularly with reference to FIG. 4. As shown in FIGS. 5–7 each end of the chassis incorporates a pair of flexible elongate pivot arms 28 and 30 having pivots 32 and 34 projecting laterally and inwardly from one end thereof and being received within respective pivot openings 36 and 38 of the chassis 12. The pivot arms 28 and 30 are urged in one pivotal direction by a pair of torsion springs 40 and 42 which are respectively received within torsion spring receptacles 44 and 46 of the chassis and which circumscribe the pivot elements and have end portions which are disposed in free transmitting relation with the chassis and pivot arms.

The end closure assemblies include end closure housings 48 and 50 which respectively define ergonomically contoured earpiece and mouthpiece embossments 52 and 54 each having a plurality of openings 56 and 58 respectively through which sound is projected. The respective interior compartments 60 and 62 of the end closures may provide for mechanical transmission of sound with respect to a speaker and a microphone enclosed within respective end portions of the chassis 12. As shown in FIGS. 5–7 a speaker device 57 is shown to be attached to an end wall 59 of the chassis for projection of sound through a plurality of openings 61 in the end wall. In the alternative, the speaker and microphone may be located within the respective end closures. In the latter case the end closures will be provided with an electrical conductor and connection for the respective microphone and speaker of the handset.

Within the respective end closures, as shown particularly in FIGS. 5–7 there are defined internal elongate guide tracks 64 and 66 within which lateral guiding and locking projections 68 and 70 of the pivot arms 28 and 30 are received. At respective ends of the guide tracks or slots 64 and 66 within the end closure are provided locking depressions. Locking depressions 72 and 74 of the respective guide tracks are provided to receive elongate portions of the pivot arms the transverse locking projections 68 and 70 of the pivot arms when the end closure is located at its fully collapsed or retracted position as shown in FIG. 5. Locking receptacles 76 and 78 defined within the end closure and in registry with the guide tracks are oriented to receive the respective locking projections 68 and 70 of the pivot arms when the respective end closure has been moved to its fully extended position as shown in FIGS. 4 and 7. The pivot arms 28 and 30 are composed of a flexible material such as any one of a number of suitable polymers and is therefore capable of flexing inwardly as shown in FIG. 6 as the end closure is being moved between its fully collapsed and fully extended positions. To permit such inward flexing of the pivot arms, the respective ends of the chassis 12 are relieved or curved inwardly as shown at 80 and 82. In the fully closed or collapsed position of the end closures the respective transverse projections 68 and 70 of the pivot arms are located within the respective locking recesses 72 and 74 as shown in FIG. 5. The locking recesses 72 and 74 are defined in part by tapered cam surfaces 84 and 86 which force the laterally extending locking projections 68 and 70 of the respective pivot arms inwardly as the end closure is being moved from its fully collapsed position toward its fully extended position. The locking receptacles 76 and 78 are defined in part by tapered cam surfaces 88 and 90 which also function to force the locking projections or detents 68 and 70 of the pivot arms inwardly as the end closure is being moved from its fully extended position toward its collapsed position. During linear extension and collapsing movement of the end closures elongate substantially straight sections of the pivot arms being received within respective guide slots or tracks 64 and 66 ensure linear alignment of the end closures relative to the chassis. The relationship ensures that articulation of the end closures relative to the chassis will occur only at the fully extended positions of the end closure.

It is also desirable that the pivot arms be capable of being releasably locked in the articulated position shown in FIG. 4. This feature is accomplished by the provision of a pair of ball detents 92 and 94 which are movably received within ball detent receptacles 96 and 98 of the chassis and being urged toward the respective locking positions thereof by means of compression springs 100 and 102. When the pivot arms 28 and 30 have been moved to the respective articulated positions thereof the ball detents 92 and 94 are urged by their respective springs into locking or positioning recesses 104 and 106 defined within the inside surface portions of the respective pivot arms. As the pivot arms are rotated to the articulated positions as shown in FIG. 4 the ball detents 92 and 94 move into registry with the respective detent recesses 104 and 106 and thus serve to lock the pivot arms at the articulated positions. This articulated locking relationship is overcome simply by applying force to the respective end closures to align them with the chassis. As this force is applied the respective ball detents are forced into their receptacles by the camming activity of their curved locking depressions against the compression of the ball detent springs thereby permitting the pivot arms to be rotated toward aligned relation with the chassis. When so aligned, the respective end closures are movable linearly to the completely collapsed positions thereof as shown in FIG. 3 since the linear guide slots permit linear guided movement of the end closures with the locking projections 68 and 70 and then respective pivot arms traversing the guide slots.

For proper orientation of the end closures at the respective extended positions thereof the chassis 12 defines opposed inclined end surfaces 108 and 110 which are orienting surfaces that are engageable by respective internal surfaces 112 and 114 of the end closures 48 and 50. When these surfaces are in contact, the respective end closure assemblies 24 and 26 are properly oriented with respect to the chassis 12. Further, the chassis 12 defines opposed orienting recesses 116 and 118 each defining respective inclined orienting surfaces 120 and 122 as shown in FIG. 3. Respective inner end portions 124 and 126 of the end closures are adapted for orienting engagement with the inclined surfaces 120 and 122 when the end closures have been properly extended and rotated to the properly inclined relation thereof with respect to the chassis. The respective pairs of inclined orienting surfaces at the ends of the chassis, together with the locking detents, provide the end closures with efficient stability at the extended positions thereof. This feature provides the telephone handset assembly with the "solid" feel of an integral handset structure. With the end closures extended, the central portion of the handset, defined by the chassis defines a "handbridge" that is efficiently designed for comfortable gripping by the user. Each of the end closures is smoothly contoured on the side and end portions thereof as shown in the drawings so that, in its closed or collapsed position as shown in FIG. 3, the telephone handset will readily slide comfortably and efficiently into a pocket of the user's clothing. This telephone handset is sufficiently small in its collapsed position as to be comfortably transported in the user's clothing or in a purse, handbag, briefcase or other transporting device.

The end closures 48 and 50 are also capable of being removed from the chassis. As shown in FIGS. 7 and 8 the end closures define opposed pin holes 128 and 130 which are in registry with the guide slots 64 and 66. When the end closures are fully extended as shown in FIGS. 4 and 7 a pin or any other suitable instrument may be inserted through the respective pin holes and used to force the pivot arms 28 and 30 to flex inwardly to the extent that the locking projections 68 and 70 thereof are unseated from the locking receptacles 76 and 78. When the locking projections 68 and 70 have been unseated or retracted in this manner the end closure may be removed simply by applying outward linear force thereto so as to move it away from the chassis. To prevent the torsion openings from over-rotating the pivot arms after the end closure has been removed the chassis is provided with external stop elements 131 and 133 which may be defined integrally with the chassis. When the end closures are removed the stop elements 131 and 133 will limit pivotal rotation of the pivot arms under the influence of the torsion springs. Assembly of the end closures to the chassis is accomplished by forcing the pivot arms inwardly and sliding the end closure over the locking projections 68 and 70 with the locking projections transversing the guide slots. When the locking projections become registered with the locking receptacles 76 and 78 during such assembly movement, they will snap into the locking receptacles by unflexing of the arms 28 and 30 thus securing the end closure in extendable, retractable and pivotal relation with respect to the chassis.

The "microphone" end closure 50 may be provided with an antenna 132 which is coupled via a conductor 134 to the electronics of the chassis 12. Likewise, the antenna 132 may be coupled to the "earpiece" end closure 48 if desired. Location of the antenna at the bottom portion of the telephone handset will provide the user with maximum protection by displacement from radiation that might be emitted therefrom. It may also be desirable to "activate" the electronic system or a portion thereof of the telephone handset upon articulation of the handset to the position shown in FIG. 4. In this case the chassis is provided with a microswitch 136 which is positioned for engagement by one of the lower pivot arms as it is pivoted to the position shown in FIG. 4. If desired the microswitch may be a normally on or normally off switch depending upon the electronic circuitry with which it is disposed in controlling relation.

Referring now to FIGS. 10 and 11 an alternative embodiment of the present invention is illustrated generally at 150 which includes a chassis 152 having a "mouthpiece" structure 154 provided at one end thereof which has a configuration and contour such as that shown at 54 in FIGS. 1–4. The telephone handset 150 may also be provided with an antenna 156 which extends downwardly from the chassis thereby positioning it remotely from the brain of the user to provide the user with maximum protection by displacement from radiation that might be emitted therefrom. As shown particularly in FIG. 11, the chassis 152 includes an end section 158 of reduced dimension which defines a keypad 160 having a plurality of operating keys 162, unless the phone is designed to be controlled by voice recognition and response, in which case 160 may represent a visual display. Intersection of the reduced dimension end section 158 with the opposite end portion of the chassis 152 defines a circumferential shoulder 164. The end closure defines a circumferential edge at its inner end which engages the circumferential shoulder 164 when the end closure is fully collapsed. An end closure 168 is disposed in movable assembly with the chassis and is both linearly movable and pivotal relative to the chassis as shown in FIG. 11.

For extension of the end closure 168 relative to the chassis 152 the end closure defines opposed internal guide slots or tracks shown in broken line at 172 which are adapted to receive pivot arms 174 that are supported in pivotal relation with the chassis by means of pivots 176. These pivot arms may be urged by torsion springs or by other suitable means in a rotating direction for articulating movement of the end closure to the position shown in FIG. 11 to provide the handset with an ergonomic configuration for efficient use. Any suitable locking mechanism such as that shown in FIGS. 1–9 may be employed to releasably lock the end closure at its collapsed or extended and articulated positions relative to the chassis. The alternative embodiment shown in FIGS. 10–11 will operate similar to that of the preferred embodiment of FIGS. 1–9.

For use of the handset assembly of the first embodiment of FIGS. 1–9 the user will simply remove the collapsed handset from a clothing pocket or other suitable means for its transportation and storage. The user will then extend the handset by applying sufficient force on the end closure 24 (and apply the same process to the opposite end closure 26) to cause the opposed cam surfaces 84 and 86 to yield the locking projections 72 and 74 inwardly by bending the respective flexible pivot arms 28 and 30. After the locking projections have cleared the locking recesses 72 and 74, the end closure 48 will be free for linear movement in the manner shown in FIG. 6 to its fully extended position as shown in FIGS. 4 and 7. When the end closure is fully extended the locking projections 72 and 74 will snap outwardly by unflexing of the pivot arms 28 and 30 thereby positioning the locking projections within the locking recesses 76 and 78. After the end closure has been fully extended the torsion springs 40 and 42 will automatically pivot the arms 28 and 30 thus pivoting the end closure 48 toward its articulated position as shown in FIG. 4 whereupon the ball detents 92 and 94 will be shifted by their respective compression springs into the locking detent recesses 104 and 106. When this has occurred the end closure will be releasably locked at its articulated position. If then subjected to lateral force, the end closure will easily overcome the compression of the ball detent springs 100 and 102 thereby unlocking the ball detents from their locking recesses and allowing the end closure to be pivoted to its straight, aligned relation with the chassis against the influence of the torsion springs 40 and 42. Thus, if the handset is inadvertently dropped or is stepped on or otherwise forcibly flattened when fully extended, it will not be damaged. When the straightening force is released the torsion springs will automatically return the end closure or closures to the articulated position.

After telephone handset usage has been completed, the user will simply apply sufficient force to the end closure 24 (and apply the same process to the opposite end closure 26) to unseat the ball detents 92 and 94 and overcome the force of the torsion springs 40 and 42 and to align the end closure with the chassis. The user will then apply sufficient linear force to cause the cam surfaces 88 and 90 to unseat the locking projections 68 and 70 from the locking receptacles 76 and 78. When this has occurred, the linearly applied force will simply shift the end closure toward its collapsed position with the locking projections traversing the opposed guide slots 64 and 66 until such point as they snap outwardly into the respective locking receptacles 72 and 74 by unflexing of the pivot arms.

Extension and collapsing of the end closure 168 of the alternative embodiment shown in FIGS. 10 and 11 will occur in much the same way as described above. From its collapsed condition as shown in FIG. 10, the end closure is unlocked and extended by application of linear force thereto. After reaching its fully extended position the end closure will be pivotally articulated by application of spring force to the pivot arms.

Since certain changes or modifications may be made in the disclosed embodiments without departing from the inventive concepts involved, it is the aim of the appended claims to cover all such changes and modifications falling within the true spirit and scope of the present invention.

What is claimed is:

1. A portable telephone handset comprising:
   (a) an elongate substantially straight telephone handset chassis having an end section;
   (b) a pair of guide and positioning arms each having pivots connected in pivotal relation with said telephone chassis, each of said guide and positioning arms being flexible and having an elongate arm section and a locking projection thereon;
   (c) at least one end closure defining internal guide slots of elongate configuration and having spaced locking recesses defined in part by a cam surface and being disposed for receiving a respective one of said locking projections, said end closure being in linear sliding and articulatable assembly with said telephone handset chassis and being movable easily from a collapsed position where said at least one end closure encloses said end section of said telephone handset chassis and being linearly movable to an extended position exposing said end section of said telephone handset chassis;
   (d) said elongate arm section of each of said guide and positioning arms being received in guiding relation within a respective one of said internal guide slots; and
   (e) said at least one end closure being linearly movable in guided relation with said telephone chassis and said guide and positioning arms from collapsed positions enclosing said end section of said telephone chassis and extended positions exposing said end section of said telephone chassis, said at least one end closure further being pivotally movable about said pivots at the substantially fully extended positions to thus provide for articulation of said at least one end closure to inclined relation with said telephone chassis.

2. The portable telephone handset of claim 1, wherein:
   said at least one end closure being a pair of end closures each being receivable in movable relation with said telephone handset chassis and in the collapsed positions thereof enclosing respective extremities of said telephone handset chassis, each of said end closures having means for auditory transmission of sound waves.

3. The collapsible telephone handset of claim 1, wherein:
   said pivot arms each defining of elongate straight portions being receivable in guided relation within respective guide slots and permitting articulation of said at least one end closure relative to said chassis only when said at least one end closure is substantially fully extended relative to said chassis.

4. The collapsible telephone handset of claim 1, wherein:
   said locking recesses being defined in part by cam surfaces oriented for shifting said locking projections from said locking recesses upon linear movement of said at least one end closure relative to said chassis.

5. The portable telephone handset of claim 1, wherein:
   said at least one end closure being articulatable to angulated relation with said telephone handset chassis when located at said extended position relative to said telephone handset chassis.

6. The portable telephone handset of claim 1, further comprising:
   spring means being interposed between said telephone handset chassis and said pivot arms for spring urged positioning and restraining of said at least one end closure at said angulated relation with said telephone handset chassis.

7. The portable telephone handset of claim 1, further comprising:
   (a) first positioning means being defined by said telephone handset chassis;
   (b) second positioning means being defined by said at least one end closure and cooperatively engaging said first positioning means for positioning said at least one end closure in said inclined relation with said chassis.

8. A portable telephone handset construction comprising:
(a) an elongate, substantially rigid telephone handset chassis defining first and second extremities;
(b) a pair of guide and positioning arms each having pivots connected in pivotal relation with said telephone chassis each of said guide and positioning arms being flexible and having an elongate arm section and a locking projection thereon;
(c) end closure means defining internal guide slots of elongate configuration and having spaced locking recesses defined in part by a cam surface and being disposed for receiving a respective one of said locking projections, said end closure being movable to a collapsed position enclosing an extremity of said telephone handset chassis and being movable to an extended and angulated position relative to said telephone handset chassis for exposing a portion of said first and second extremities of said telephone handset chassis;
(d) said elongate arm section of each of said guide and positioning arms being received in guiding relation within a respective one of said internal guide slots: and
(e) said end closures being linearly movable in guided relation with said telephone chassis and said guide and positioning arms from collapsed positions enclosing respectively said first and second extremities of said telephone chassis and extended positions exposing selected portions of said telephone chassis, said end closures further being pivotally movable about said pivots at the substantially fully extended positions to thus provide for articulation of said end closures to inclined relation with said telephone chassis.

9. The portable telephone handset construction of claim 8, wherein:
(a) said telephone handset chassis defines at least one closure orienting surface at each end thereof; and
(b) said end closure having at least one internal positioning surface for orienting engagement with said closure orienting surface.

10. The portable telephone handset construction of claim 8, further comprising:
spring elements being disposed in urging relation with said telephone handset chassis and each of said pivot arms, said spring elements urging said pivot arms in a direction for angulated positioning of said end closures.

11. The portable telephone handset construction of claim 8, further comprising:
(a) pivot arm positioning means being exposed externally of said telephone handset chassis;
(b) said pivot arms each defining positioning recesses for releasably receiving said pivot arm positioning means at predetermined angulated positions thereof relative to said telephone handset chassis to thus provide for releasable angulated positioning of said pivot arms and said end closures relative to said telephone handset chassis.

12. The portable telephone handset construction of claim 8, further comprising:
stop elements being located on said telephone handset chassis and limiting pivotal movement of said pivot arms relative to said telephone handset chassis.

13. The portable telephone handset construction of claim 8, further comprising:
a control switch being located externally of said telephone handset chassis and at a location traversed by at least one of said pivot arms during closure angulating movement thereof, whereby, upon angulating movement of said pivot arm and end closure, said control switch being actuated.

14. The portable telephone handset construction of claim 8, wherein:
(a) said telephone handset chassis defines sound openings at respective end portions thereof;
(b) speaker and microphone elements being enclosed within said telephone handset chassis for emitting and receiving sound through said sound openings; and
(c) said end closures each having perforate sound sections and conducting sound to and from said sound openings of said telephone handset chassis to and from said perforate sound sections of said end closures.

15. A portable telephone handset comprising:
(a) an elongate substantially straight telephone chassis defining first and second extremities;
(b) a pair of guide and positioning arms each having pivots connected in pivotal relation with said telephone chassis, each of said guide and positioning arms being flexible and having an elongate arm section and a locking projection thereon;
(c) a pair of end closure elements each defining internal guide slots of elongate configuration and defining spaced locking recesses, said spaced locking recesses being defined in part by cam surfaces and being disposed for receiving a respective one of said locking projections;
(d) said elongate arm section of each of said guide and positioning arms being received in guiding relation within a respective one of said internal guide slots; and
(e) said end closures being linearly movable in guided relation with said telephone chassis and said guide and positioning arms from collapsed positions enclosing respectively said first and second extremities of said telephone chassis and extended positions exposing selected portions of said telephone chassis, said end closures further being pivotally movable about said pivots at the substantially fully extended positions to thus provide for articulation of said end closures to inclined relation with said telephone chassis.

* * * * *